Patented Feb. 20, 1934

1,948,469

UNITED STATES PATENT OFFICE 1,948,469

OIL-SOLUBLE RESIN

Kenneth M. Irey, New Brunswick, N. J., assignor to Resinox Corporation, New York, N. Y., a corporation of Delaware No Drawing. Application October 29, 1931
Serial No. 571,863

11 Claims. (Cl. 260—4)

The present invention pertains to phenol-ketone-aldehyde resins. More particularly, it pertains to improved phenol-ketone-aldehyde resins which are soluble in the customary drying oils such as China-wood oil.

It is well known that attempts have been made in the past to produce resinous materials from phenolic compounds, ketones and aldehydes. The compositions hereinafter disclosed owe their novelty and their especially desirable properties to the proportions of reactants employed and the particular procedures employed, which give final products differing markedly in both composition and properties from materials previously obtained from substantially the same reactants.

The new resins herein disclosed and claimed are produced in two steps: Suitable proportions of a phenol and a ketone are first reacted in the presence of a catalyst such as hydrochloric acid. The excess of phenol and the acid used as catalyst are then removed by any suitable means, as for example by steam distilling. If desired, prior to the steam distilling, the hydrochlorid acid may be neutralized by means of caustic soda solution and the resulting sodium chloride solution removed. The reaction product obtained as a result of this operation is next treated with an aldehyde in the presence of an acid or alkaline catalyst, but preferably in the absence of any catalyst whatsoever.

The following specific example will serve to illustrate a preferred method of carrying out the reactions outlined above: 1 mol of acetone is first reacted with an excess (say 3 mols) of phenol in the presence of hydrochloric acid (5–6% based on the weight of phenol) as catalyst at a temperature of approximately 70–80° C. for a period of about 48 hours. The product thus obtained is next steam distilled at a temperature of approximately 160–180° C. until the excess of phenol and hydrochloric acid are removed, during which operation the color of the residue generally gets somewhat lighter. If preferred, the hydrochloric acid may be neutralized and the resulting salt solution removed before the steam distillation.

Carrying out the above reaction under the conditions specified and with the amounts of materials employed gives a final product containing approximately 50% of beta.beta-bis-[4-hydroxy-phenyl]-propane and approximately 50% of beta.beta-bis-[4-hydroxy-phenyl]-propane — acetone condensation product.

The beta.beta-bis-[4-hydroxy-phenyl]-propane is a white crystalline material with a melting point of 150–154° C. The beta.beta-bis-[4-hydroxy-phenyl]-propane—acetone condensation product is a reddish colored material having a melting point around 50° C.

The reaction described above may be regulated so as to vary the relative proportions of beta.beta-bis-[4-hydroxy-phenyl]-propane and beta.beta-bis-[4-hydroxy-phenyl]-propane—acetone condensation product in the reaction product. The proportion of the latter material in the reaction product may generally be increased by using a higher reaction temperature and a longer time of reaction, and by increasing the proportion of acetone. By suitably changing these factors it is possible to regulate the proportions of these products and thereby vary to an appreciable extent the properties of the final resin. For example, by increasing the proportion of beta.beta-bis-[4-hydroxy-phenyl]-propane—acetone condensation product it is possible to obtain a finished resin having a higher degree of oil solubility. Similarly, it is possible also to vary the melting point of the final product. For some purposes, however, increasing the proportion of beta.beta-bis-[4-hydroxy-phenyl]-propane—acetone condensation product by the means enumerated above is not advisable due to the fact that a somewhat darker resin is produced.

The second stage of the operation consists in refluxing for about 2 hours the mixture of beta.beta-bis-[4-hydroxy-phenyl]-propane and beta.beta-bis-[4-hydroxy-phenyl]-propane—acetone condensation product obtained as above described, or by any other suitable method, with about 20% by weight of a 40% solution of formaldehyde (0.25–0.35 mol formaldehyde per mol of phenol employed in producing the intermediate product). At the end of the reaction period designated, the water and any excess formaldehyde are removed by distilling the mixture in vacuo to a liquid temperature of approximately 200° C. The resulting resin is found to have a melting point of approximately 100–110° C. and to be substantially oil soluble.

A somewhat less desirable procedure consists of refluxing the intermediate product containing beta.beta-bis-[4-hydroxy-phenyl]-propane and beta.beta-bis-[4-hydroxy-phenyl]-propane—acetone condensation product with approximately 50% by weight of a 40% solution of formaldehyde until the melting point of a sample of the reaction mixture is found to be about the desired value. For most purposes it has been found that a product having a melting point of about 110° C. gives very satisfactory results for use as an oil-soluble resin. To obtain such a product usually requires about 8-12 hours refluxing. In order to determine when the reaction has progressed sufficiently a sample of the reaction product is placed in a test tube and heated to approximately 250° C. and the melting point of the resulting product then determined. When, as a result of this test or other means, it is found that the melting point of the resin is about 100° C., or other suitable temperature if such a product is desired, the excess formaldehyde and the water are removed by distilling the reaction mixture to a liquid temperature of approximately 230° C. During this distillation process the melting point of the resin has generally been found to increase about 10° C. when working with about one pound of resin. If, however, the distilation is carried out in vacuo there is generally little, if any, increase in the melting point of the resin.

A resin of the same general character may also be obtained by using lesser amounts of formaldehyde in the reaction mixture, provided methanol or other suitable material is employed as a solvent for the reactants, and a catalyst such as hydrochloric acid is used. The material obtained by such a procedure, however, is usually somewhat darker in color than the resin made by the procedure outlined above.

When hydrochloric acid is used as a catalyst, it is not necessary to use such a large excess of formaldehyde as is the case when no catalyst is employed. When using a catalyst it is advisable to heat the intermediate material with the aldehyde until the solution is homogeneous before adding the catalyst.

An alkaline catalyst may also be employed, if desired. The use of either an acid or alkaline catalyst, however, presents some disadvantages due to the fact that the resins produced under such conditions are generally darker than similar products formed without the aid of a catalyst. For this reason it is generally preferred to use an excess of formaldehyde without a catalyst.

In the second stage of the reaction from 0.25 to 0.35 mol of formaldehyde react per mol of phenol employed in the production of the intermediate product (the excess phenol recovered at the end of the first stage is, of course, not included in the above amounts). While the exact composition of the material formed by the interaction is not definitely known, it appears to consist of molecules of beta.beta-bis-[4-hydroxyphenyl]-propane and beta.beta-bis-[4-hydroxyphenyl]-propane—acetone condensation product joined by methylene groups (—CH₂—) from the formaldehyde.

Although the most desirable form of oil-soluble resins appears to be produced when reacting approximately 0.25-0.35 mols of formaldehyde per mol of phenol employed in producing the mixture of beta.beta-bis-[4-hydroxy-phenyl]-propane and beta.beta-bis-[4-hydroxy-phenyl]-propane—acetone condensation product, an oil-soluble resin of satisfactory properties may, as indicated above, be obtained by using proportions of aldehyde somewhat different from the amount just stated. To obtain an oil-soluble product, however, it is generally necessary to react less than 0.5 mol of formaldehyde per mol of phenol employed in producing the mixture of beta.beta-bis-[4-hydroxy-phenyl]-propane and beta.beta-bis-[4-hydroxy-phenyl]-propane—acetone condensation product, and for most purposes better results are produced when staying within the limit of 0.1-0.4 mol.

The proportion of beta.beta-bis-[4-hydroxyphenyl]-propane to beta.beta-bis-[4-hydroxyphenyl]-propane—acetone condensation product in the intermediate material, the time and temperature of the reaction and the amount of formaldehyde reacted during the second stage of the operation determine the melting point of the final resin.

Resin prepared as described in the example cited above is very light in color, soluble in drying oils, such as China-wood oil, and has melting points ranging from 80°-140° C., depending upon the amounts of formaldehyde reacted and the period of the reaction. The resins with the lower melting points are the more easily soluble in drying oils but do not accelerate the drying of varnishes as much as similar materials with higher melting points. For use in varnishes it is generally advisable to stop the reaction at a point where a resin having a melting point of 105-115° C., and preferably not above 125° C., is obtained, such resins being substantially completely soluble and at the same time give dry films in less than four hours in a 30-gallon varnish.

The process set forth above is generally applicable to the preparation of resinous condensation products from ketones, phenolic bodies and aldehydes. In place of acetone other ketones such as methyl ethyl ketone, methyl propyl ketone, ethyl propyl ketone, etc. may be substituted. For phenol there may, of course, be substituted its homologues such as the cresols and in the appended claims the term "phenols" is used as including both phenol and the cresols. Instead of the formaldehyde used in the specific example, one may substitute other aldehydes such as acetaldehyde, butyraldehyde, propionaldehyde, etc.

What is claimed is:

1. In a process of producing an oil-soluble synthetic resin, the step which comprises reacting at the refluxing temperature of the mixture, a mixture of a bis-[4-hydroxy-aryl]-dialkyl methane and a bis-[4-hydroxy-aryl]-dialkyl methane—ketone condensation product with not in excess of 0.5 mol. of an aldehyde for each mol. of phenol reacted in producing said mixture of bis-[4-hydroxy-aryl]-dialkyl methane and bis-[4-hydroxy-aryl]-dialkyl methane—ketone condensation product.

2. In a process of producing an oil-soluble synthetic resin, the step which comprises reacting at the refluxing temperature of the mixture, a mixture of bis-[4-hydroxy-aryl]-dialkyl methane and a bis-[4-hydroxy-aryl]-dialkyl methane—ketone condensation product with approximately 0.25-0.35 mol. of an aldehyde per mol. of phenol reacted in producing said mixture of bis-[4-hydroxy-aryl]-dialkyl methane and bis-[4-hydroxy-aryl]-dialkyl methane—ketone condensation product.

3. In a process of producing an oil-soluble synthetic resin, the step which comprises reacting at the refluxing temperature of the mixture, a mixture of beta.beta-bis-[4-hydroxy-phenyl]-propane and beta.beta-bis-[4-hydroxy-phenyl]-propane—acetone condensation product with approximately 0.25-0.35 mol. of an aldehyde per mol. of phenol reacted in producing said mixture of beta.beta-bis-[4-hydroxy-phenyl]-propane and beta.beta-bis-[4-hydroxy-phenyl]-propane—acetone condensation product.

4. In a process of producing an oil-soluble synthetic resin, the step which comprises reacting at the refluxing temperature of the mixture, a mixture of beta.beta-bis-[4-hydroxy-phenyl]-propane and beta.beta-bis-[4-hydroxy-phenyl]-propane—acetone condensation product with approximately 0.25–0.35 mol of an aldehyde per mol of phenol reacted in producing said mixture of beta.beta-bis-[4-hydroxy-phenyl]-propane and beta.beta-bis-[4-hydroxy-phenyl]-propane—acetone condensation product, and removing the excess of formaldehyde and water.

5. In a process of producing an oil-soluble synthetic resin, the step which comprises reacting at the refluxing temperature of the mixture, a mixture of beta.beta-bis-[4-hydroxy-phenyl]-propane and beta.beta-bis-[4-hydroxy-phenyl]-propane—acetone condensation product with approximately 0.25–0.35 mol of formaldehyde per mol of phenol reacted in producing said mixture of beta.beta.bis-[4-hydroxy-phenyl]-propane and beta.beta-bis-[4-hydroxy-phenyl]-propane—acetone condensation product.

6. In a process of producing an oil-soluble synthetic resin, the step which comprises reacting at the refluxing temperature of the mixture, a mixture of beta.beta-bis-[4-hydroxy-phenyl]-propane and beta.beta-bis-[4-hydroxy-phenyl]-propane—acetone condensation product with in excess of 0.1 but not in excess of 0.5 mol of formaldehyde per mol. of phenol reacted in producing said mixture of beta.beta-bis-[4-hydroxy-phenyl]-propane and beta.beta-bis-[4-hydroxy-phenyl]-propane—acetone condensation product.

7. A synthetic resin derived from the condensation of a mixture of bis-[4-hydroxy-aryl]-dialkyl methane and bis-[4-hydroxy-aryl]-dialkyl methane—ketone condensation product with an aldehyde.

8. A synthetic resin derived from the condensation of a mixture of bis-[4-hydroxy-aryl]-dialkyl methane and bis-[4-hydroxy-aryl]-dialkyl methane—ketone condensation product with in excess of 0.1 but not in excess of 0.5 mol. of an aldehyde per mol. of phenol reacted in producing said mixture of bis-[4-hydroxy-aryl]-dialkyl methane and bis-[4-hydroxy-aryl]-dialkyl methane—ketone condensation product.

9. An oil-soluble synthetic resin melting below 125° C. derived from the condensation of a mixture of bis-[4-hydroxy-aryl]-dialkyl methane and bis-[4-hydroxy-aryl]-dialkyl methane—ketone condensation product with in excess of 0.1 but not in excess of 0.5 mol of an aldehyde per mol of phenol reacted in producing said mixture of bis-[4-hydroxy-aryl]-dialkyl methane and bis-[4-hydroxy-aryl]-dialkyl methane—ketone condensation product.

10. A synthetic resin derived from the condensation of a mixture of beta.beta-bis-[4-hydroxy-phenyl]-propane and beta.beta-bis-[4-hydroxy-phenyl]-propane—acetone condensation product with formaldehyde.

11. An oil-soluble synthetic resin melting below 125° C. derived from the condensation of a mixture of beta.beta-bis-[4-hydroxy-phenyl]-propane and beta.beta-bis-[4-hydroxy-phenyl]-propane—acetone condensation product with in excess of 0.1 but not in excess of 0.5 mol of formaldehyde per mol of phenol reacted in producing said mixture of beta.beta-bis-[4-hydroxy-phenyl]-propane and beta.beta-bis-[4-hydroxy-phenyl]-propane—acetone condensation product.

KENNETH M. IREY.

CERTIFICATE OF CORRECTION.

Patent No. 1,948,469.

February 20, 1934.

KENNETH M. IREY.

It is hereby certified that error appears in the printed specification of the above numbered patent requiring correction as follows: Page 1, line 84, for "2" read 8; and that the said Letters Patent should be read with this correction therein that the same may conform to the record of the case in the Patent Office.

Signed and sealed this 19th day of June, A. D. 1934.

Bryan M. Battey (Seal)

Acting Commissioner of Patents.

imately 0.25-0.35 mol of an aldehyde per mol of phenol reacted in producing said mixture of beta.beta-bis-[4-hydroxy-phenyl]-propane and beta.beta-bis-[4-hydroxy-phenyl]-propane—acetone condensation product, and removing the excess of formaldehyde and water.

5. In a process of producing an oil-soluble synthetic resin, the step which comprises reacting at the refluxing temperature of the mixture, a mixture of beta.beta-bis-[4-hydroxy-phenyl]-propane and beta.beta-bis-[4-hydroxy-phenyl]-propane—acetone condensation product with approximately 0.25-0.35 mol of formaldehyde per mol of phenol reacted in producing said mixture of beta.beta.bis-[4-hydroxy-phenyl]-propane and beta.beta-bis-[4-hydroxy-phenyl]-propane—acetone condensation product.

6. In a process of producing an oil-soluble synthetic resin, the step which comprises reacting at the refluxing temperature of the mixture, a mixture of beta.beta-bis-[4-hydroxy-phenyl]-propane and beta.beta-bis-[4-hydroxy-phenyl]-propane—acetone condensation product with in excess of 0.1 but not in excess of 0.5 mol of formaldehyde per mol. of phenol reacted in producing said mixture of beta.beta-bis-[4-hydroxy-phenyl]-propane and beta.beta-bis-[4-hydroxy-phenyl]-propane—acetone condensation product.

7. A synthetic resin derived from the condensation of a mixture of bis-[4-hydroxy-aryl]-dialkyl methane and bis-[4-hydroxy-aryl]-dialkyl methane—ketone condensation product with an aldehyde.

8. A synthetic resin derived from the condensation of a mixture of bis-[4-hydroxy-aryl]-dialkyl methane and bis-[4-hydroxy-aryl]-dialkyl methane—ketone condensation product with in excess of 0.1 but not in excess of 0.5 mol. of an aldehyde per mol. of phenol reacted in producing said mixture of bis-[4-hydroxy-aryl]-dialkyl methane and bis-[4-hydroxy-aryl]-dialkyl methane—ketone condensation product.

9. An oil-soluble synthetic resin melting below 125° C. derived from the condensation of a mixture of bis-[4-hydroxy-aryl]-dialkyl methane and bis-[4-hydroxy-aryl]-dialkyl methane—ketone condensation product with in excess of 0.1 but not in excess of 0.5 mol of an aldehyde per mol of phenol reacted in producing said mixture of bis-[4-hydroxy-aryl]-dialkyl methane and bis-[4-hydroxy-aryl]-dialkyl methane—ketone condensation product.

10. A synthetic resin derived from the condensation of a mixture of beta.beta-bis-[4-hydroxy-phenyl]-propane and beta.beta-bis-[4-hydroxy-phenyl]-propane—acetone condensation product with formaldehyde.

11. An oil-soluble synthetic resin melting below 125° C. derived from the condensation of a mixture of beta.beta-bis-[4-hydroxy-phenyl]-propane and beta.beta-bis-[4-hydroxy-phenyl]-propane—acetone condensation product with in excess of 0.1 but not in excess of 0.5 mol of formaldehyde per mol of phenol reacted in producing said mixture of beta.beta-bis-[4-hydroxy-phenyl]-propane and beta.beta-bis-[4-hydroxy-phenyl]-propane—acetone condensation product.

KENNETH M. IREY.

CERTIFICATE OF CORRECTION.

Patent No. 1,948,469.  February 20, 1934.

KENNETH M. IREY.

It is hereby certified that error appears in the printed specification of the above numbered patent requiring correction as follows: Page 1, line 84, for "2" read 8; and that the said Letters Patent should be read with this correction therein that the same may conform to the record of the case in the Patent Office.

Signed and sealed this 19th day of June, A. D. 1934.

Bryan M. Battey (Seal)

Acting Commissioner of Patents.